US008321043B2

(12) United States Patent
Onitsuka

(10) Patent No.: US 8,321,043 B2
(45) Date of Patent: Nov. 27, 2012

(54) SIMULATION APPARATUS AND PROGRAM

(75) Inventor: Hirofumi Onitsuka, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1056 days.

(21) Appl. No.: 12/266,496

(22) Filed: Nov. 6, 2008

(65) Prior Publication Data

US 2009/0125135 A1 May 14, 2009

(30) Foreign Application Priority Data

Nov. 8, 2007 (JP) ................................ 2007-290790

(51) Int. Cl.
*G06F 17/00* (2006.01)
*H04B 15/00* (2006.01)
*G06G 7/48* (2006.01)

(52) U.S. Cl. ............ 700/94; 381/94.2; 381/94.9; 703/7

(58) Field of Classification Search ................ 381/94.3, 381/94.9, 96, 118; 700/94; 702/7, 13; 703/103
See application file for complete search history.

(56) References Cited

U.S. PATENT DOCUMENTS 4,888,811 A 12/1989 Takashi
5,572,443 A 11/1996 Emoto et al.
6,350,943 B1 * 2/2002 Suruga et al. .................. 84/603
6,760,451 B1 7/2004 Craven et al.
2005/0254662 A1 * 11/2005 Blank et al. .................... 381/58
2006/0147050 A1 7/2006 Geisler
2010/0010786 A1 * 1/2010 Maxwell .......................... 703/2

FOREIGN PATENT DOCUMENTS

JP 2003-090758 3/2003
JP 2005-308726 11/2005
JP 2006-065466 3/2006

OTHER PUBLICATIONS

European Search Report mailed Oct. 29, 2010, for EP Patent Application No. 08019523.3, four pages.

* cited by examiner

*Primary Examiner* — Jesse Elbin
(74) *Attorney, Agent, or Firm* — Morrison & Foerster LLP

(57) ABSTRACT

In a simulation apparatus, a difference data generation part compares a simulation result of an existing sound generator with a simulation result of a virtual sound generator, and generates difference data representing a difference between the simulation result of the existing sound generator and the simulation result of the virtual sound generator. A characteristic correction part corrects a measurement result of the existing sound generator based on the difference data, and generates virtual sound generator prediction data representing the sound generation characteristic of the virtual sound generator according to the corrected measurement result of the existing sound generator.

18 Claims, 10 Drawing Sheets

START

SA10 SIMULATE EXISTING PRODUCT

SA20 SIMULATE DEVELOPED PRODUCT

SA30 GENERATE RATIO DATA

SA40 GENERATE EXISTING PRODUCT ACTUAL MEASUREMENT SPECTRUM

SA50 GENERATE CHARACTERISTIC PREDICTION SPECTRUM

SA60 GENERATE SYNTHESIS SPECTRUM

SA70 RECEIVE AUDIO DATA OF EXISTING PRODUCT

SA80 GENERATE PREDICTED AUDIO DATA

END

SIMULATION APPARATUS AND PROGRAM

BACKGROUND OF THE INVENTION

1. Technical Field of the Invention

The present invention relates to a technology for analyzing and audibly outputting a sound generated by a virtual sound generator.

2. Description of the Related Art

Conventional acoustic wave simulation enables accurate reproduction of a real acoustic phenomenon when the model of a target object, a target space, a constraint condition, or the like of the simulation is simple (for example, when a sound generated by striking a metal or wood panel is simulated). However, when the target object of the simulation is a sound generator having complicated conditions, the result (solution) of the simulation is degraded in accuracy and the quantitative acoustic characteristics of the simulation significantly differ from those of a real acoustic phenomenon although the qualitative acoustic characteristics thereof are generally similar to those of the real acoustic phenomenon.

The following technologies have been suggested to overcome these problems.

Patent Reference 1 has disclosed a technology in which acoustic characteristics of a molded product are analyzed by calculating local physical property data of the molded product and assigning the physical property data to each corresponding local region thereof, thereby achieving accurate analysis of acoustic characteristics.

Patent Reference 2 has disclosed a technology in which sound pressure spectrum data of vibration and acoustic analysis is converted into a time-series waveform, and the waveform is then reproduced through a speaker to estimate the waveform.

Patent Reference 3 has disclosed a technology in which physical characteristics of a sound absorbing/insulating material are calculated using theoretical values or measured values when a relatively large sound field is analyzed.

[Patent Reference 1] Japanese Patent Application Publication No. 2003-090758

[Patent Reference 2] Japanese Patent Application Publication No. 2005-308726

[Patent Reference 3] Japanese Patent Application Publication No. 2006-065466

In the technologies of Patent References 1 and 2, it is difficult to accurately set various input conditions that are set for analysis and that include a constraint condition, a mount condition, and a boundary condition such as a sound absorbing condition of a structure, a vibration condition of a sound source or a vibrating body, and a vibration attenuation coefficient of a structure. Errors in such input conditions cause a reduction in simulation accuracy.

In addition, if the simulation result (solution) is directly used to reproduce a sound through a speaker, the reproduced sound has a significant aural difference from a sound generated by a real object, thus failing to achieve appropriate sound estimation.

Further, when a sound is reproduced through a speaker using data of only a limited frequency band with high accuracy in simulation, i.e., when a sound is reproduced with a limited band, the reproduced sound also has a significant aural difference from a sound generated by a real object, thus failing to achieve appropriate sound estimation.

Furthermore, the technology of Patent Reference 3 also has limitations in accuracy of analysis in association with the validity of a logical model or the matching thereof with a target model when theoretical values are used, and in association with actual measurement under an ideal condition of a single substance rather than under a real sound field when measured values are used.

SUMMARY OF THE INVENTION

The invention has been made in view of the above problems, and it is an object of the invention to provide a simulation apparatus and a program that can accurately simulate sound generation characteristics of an object even when the object is of a complicated system model.

In accordance with the present invention, the above and other objects can be accomplished by the provision of a simulation apparatus comprising: an existing sound generator simulation part that simulates a sound generation characteristic of an existing sound generator and that provides a simulation result; a virtual sound generator simulation part that simulates a sound generation characteristic of a virtual sound generator and that provides a simulation result; an existing sound generator measurement part that measures the sound generation characteristic of the existing sound generator when the existing sound generator actually generates a sound and that provides a measurement result; a first difference data generation part that compares the simulation result of the existing sound generator with the simulation result of the virtual sound generator, and that generates difference data representing a difference between the simulation result of the existing sound generator and the simulation result of the virtual sound generator; and a first characteristic correction part that corrects the measurement result of the existing sound generator based on the difference data, and that generates virtual sound generator prediction data representing the sound generation characteristic of the virtual sound generator according to the corrected measurement result of the existing sound generator.

In the above configuration, the existing sound generator simulation part simulates a frequency response as the sound generation characteristic of the existing sound generator, the virtual sound generator simulation part simulates a frequency response as the sound generation characteristic of the virtual sound generator, the first difference data generation part calculates the difference between the simulated frequency response of the existing sound generator and the simulated frequency response of the virtual sound generator, and the existing sound generator measurement part measures the frequency response of the existing sound generator when the existing sound generator actually generates a sound.

In addition, the existing sound generator simulation part simulates a phase characteristic as the sound generation characteristic of the existing sound generator, the virtual sound generator simulation part simulates a phase characteristic as the sound generation characteristic of the virtual sound generator, the first difference data generation part calculates the difference between the simulated phase characteristic of the existing sound generator and the simulated phase characteristic of the virtual sound generator, and the existing sound generator measurement part measures the phase characteristic of the existing sound generator when the existing sound generator actually generates a sound.

In another embodiment of the invention, there is provided a simulation apparatus comprising: an existing sound generator simulation part that simulates a sound generation characteristic of an existing sound generator and that provides a simulation result; a virtual sound generator simulation part that simulates a sound generation characteristic of a virtual sound generator and that provides a simulation result; an existing sound generator measurement part that measures the sound generation characteristic of the existing sound generator when the existing sound generator actually generates a sound and that provides a measurement result; a second difference data generation part that compares the simulation result of the existing sound generator with the measurement result of the existing sound generator, and that generates difference data representing a difference between the simulation result of the existing sound generator and the measurement result of the existing sound generator; and a second characteristic correction part that corrects the simulation result of the virtual sound generator based on the difference data, and that generates virtual sound generator prediction data representing the sound generation characteristic of the virtual sound generator according to the corrected simulation result of the virtual sound generator.

In the above configuration, the existing sound generator simulation part simulates a frequency response as the sound generation characteristic of the existing sound generator, the existing sound generator measurement part measures the frequency response of the existing sound generator when the existing sound generator actually generates a sound, and the second difference data generation part calculates the difference between the simulated frequency response of the existing sound generator and the measured frequency response of the existing sound generator.

In addition, the existing sound generator simulation part simulates a phase characteristic as the sound generation characteristic of the existing sound generator, the existing sound generator measurement part measures the phase characteristic of the existing sound generator when the existing sound generator actually generates a sound, and the second difference data generation part calculates the difference between the simulated phase characteristic of the existing sound generator and the measured phase characteristic of the existing sound generator.

In the above configuration, the simulation apparatus may further comprise a receiving part that receives audio data representing a sound generated by the existing sound generator; and an audio data alteration part that alters the audio data received by the receiving part based on the virtual sound generator prediction data, and that outputs the altered audio data.

In the above configuration, the simulation apparatus may further comprise a transfer characteristic simulation part that simulates a transfer characteristic of a sound of an acoustic structure that is associated with the virtual sound generator, and that provides a simulation result of the transfer characteristic of the acoustic structure; and a first prediction data correction part that corrects the virtual sound generator prediction data based on the simulation result of the acoustic structure, and that predicts a composite sound generation characteristic of a combination of the virtual sound generator and the acoustic structure where the virtual sound generator generates the sound and the acoustic structure transfers the generated sound.

In addition, the simulation apparatus may further comprise a transfer characteristic measurement part that measures a transfer characteristic of a sound of an acoustic structure that is associated with the virtual sound generator, and that provides a measurement result of the transfer characteristic of the acoustic structure; and a second prediction data correction part that corrects the virtual sound generator prediction data based on the measurement result of the acoustic structure, and that predicts a composite sound generation characteristic of a combination of the virtual sound generator and the acoustic structure where the virtual sound generator generates the sound and the acoustic structure transfers the generated sound.

In the above configuration, the simulation apparatus may further comprise an existing acoustic structure simulation part that simulates a transfer characteristic of a sound of an existing acoustic structure and that provides a simulation result of the existing acoustic structure; a virtual acoustic structure simulation part that simulates a transfer characteristic of a sound of a virtual acoustic structure and that provides a simulation result of the virtual acoustic structure; an existing acoustic structure measurement part that measures the transfer characteristic of the existing acoustic structure when the existing acoustic structure transfers a sound and that provides a measurement result of the existing acoustic structure; a third difference data generation part that compares the simulation result of the existing acoustic structure with the simulation result of the virtual acoustic structure, and that generates difference data representing a difference between the simulation result of the existing acoustic structure and the simulation result of the virtual acoustic structure; a third characteristic correction part that corrects the measurement result of the existing acoustic structure based on the difference data, and that generates virtual acoustic structure prediction data representing the transfer characteristic of the sound of the virtual acoustic structure according to the corrected measurement result of the existing acoustic structure; and a third prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

In addition, the simulation apparatus may further comprise an existing acoustic structure simulation part that simulates a transfer characteristic of a sound of an existing acoustic structure and that provides a simulation result of the existing acoustic structure; a virtual acoustic structure simulation part that simulates a transfer characteristic of a sound of a virtual acoustic structure and that provides a simulation result of the virtual acoustic structure; an existing acoustic structure measurement part that measures the transfer characteristic of the existing acoustic structure when the existing acoustic structure transfers a sound; a fourth difference data generation part that compares the simulation result of the existing acoustic structure with the measurement result of the existing acoustic structure, and that generates difference data representing a difference between the simulation result of the existing acoustic structure and the measurement result of the existing acoustic structure; a fourth characteristic correction part that corrects the simulation result of the virtual acoustic structure based on the difference data, and that generates virtual acoustic structure prediction data representing the transfer characteristic of the sound of the virtual acoustic structure according to the corrected simulation result of the virtual acoustic structure; and a fourth prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

In accordance with the invention, there is also provided a program executable by a computer to perform a method of predicting a sound generation characteristic of a virtual sound generator, wherein the method comprises: an existing sound generator simulation process of simulating a sound generation characteristic of an existing sound generator and providing a simulation result; a virtual sound generator simulation process of simulating the sound generation characteristic of the virtual sound generator and providing a simulation result; an existing sound generator measurement process of measuring the sound generation characteristic of the existing sound generator when the existing sound generator actually generates a sound and providing a measurement result; a first difference data generation process of comparing the simulation result of the existing sound generator with the simulation result of the virtual sound generator, and generating difference data representing a difference between the simulation result of the existing sound generator and the simulation result of the virtual sound generator; and a first characteristic correction process of correcting the measurement result of the existing sound generator based on the difference data, and generating virtual sound generator prediction data representing the sound generation characteristic of the virtual sound generator according to the corrected measurement result of the existing sound generator.

In accordance with another embodiment of the invention, there is provided a program executable by a computer to perform a method of predicting a sound generation characteristic of a virtual sound generator, wherein the method comprises: an existing sound generator simulation process of simulating a sound generation characteristic of an existing sound generator and providing a simulation result; a virtual sound generator simulation process of simulating the sound generation characteristic of the virtual sound generator and providing a simulation result; an existing sound generator measurement process of measuring the sound generation characteristic of the existing sound generator when the existing sound generator actually generates a sound and providing a measurement result; a second difference data generation process of comparing the simulation result of the existing sound generator with the measurement result of the existing sound generator, and generating difference data representing a difference between the simulation result of the existing sound generator and the measurement result of the existing sound generator; and a second characteristic correction process of correcting the simulation result of the virtual sound generator based on the difference data, and generating virtual sound generator prediction data representing the sound generation characteristic of the virtual sound generator according to the corrected simulation result of the virtual sound generator.

The simulation apparatus and the program according to the invention can accurately simulate sound generation characteristics.

DETAILED DESCRIPTION OF THE INVENTION

The best mode for carrying out the invention will now be described in detail with reference to the drawings.

(A: Configuration)

Figure 1:
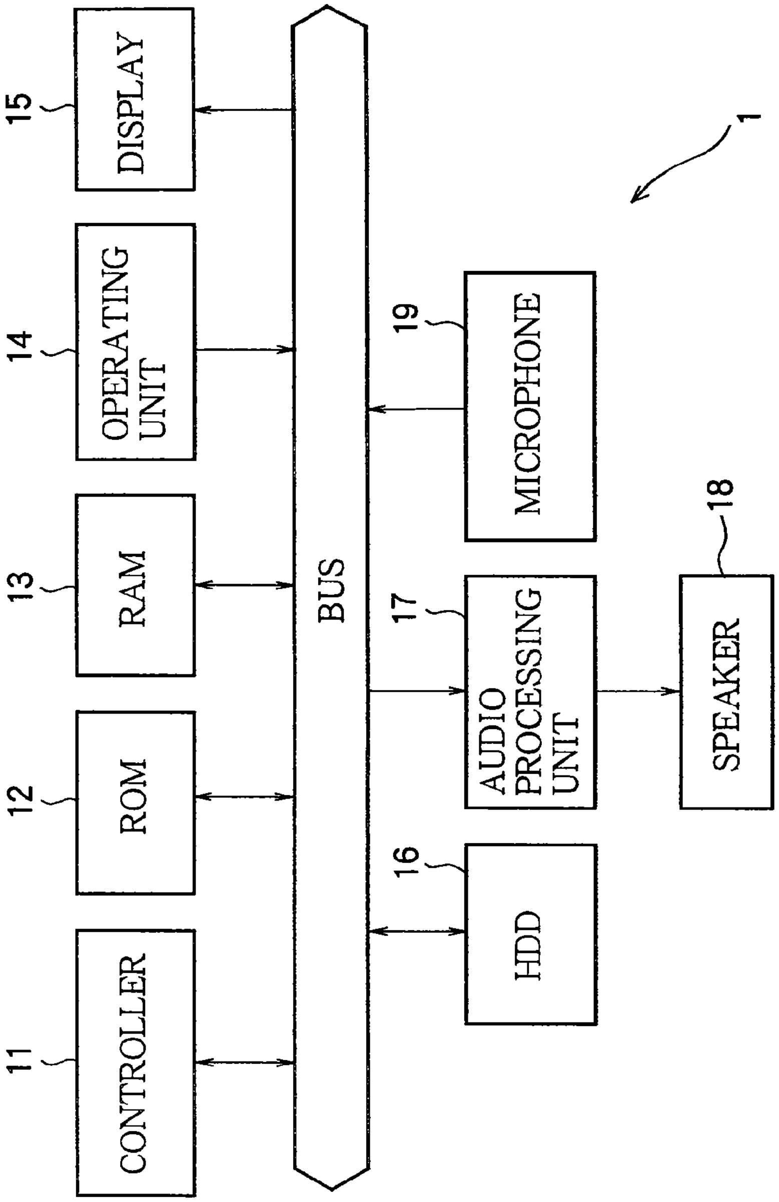
FIG. 1 illustrates a configuration of a virtual sound generation apparatus.

FIG. 1 illustrates an overall configuration of a virtual sound generation apparatus 1 constituting a virtual sound generator and its simulation apparatus according to the invention. For example, the virtual sound generation apparatus 1 is constructed of a personal computer. The virtual sound generation apparatus 1 includes a controller 11, a Read Only Memory (ROM) 12, a Random Access Memory (RAM) 13, an operating unit 14, a display 15, a Hard Disk Drive (HDD) 16, an audio processing unit 17, a speaker 18 connected to the audio processing unit 17, and a microphone 19. These components are connected to each other through a bus.

For example, the controller 11 is a Central Processing Unit (CPU) and controls each component by executing a control program stored in the ROM 12.

The ROM 12 stores the control program that is executed by the controller 11. The ROM 12 is a machine readable medium containing a program executable by the controller 11 composed of CPU to perform a method of predicting a sound generation characteristic of a virtual sound generator. The RAM 13 is used as a work area by the controller 11.

The operating unit 14 includes a variety of operators, for example a keyboard and a mouse. The operating unit 14 outputs a user operation signal, representing an operation performed by a user, to the controller 11.

The display 15 is a means for display, for example a Liquid Crystal Display (LCD). A user operation screen for performing a variety of settings associated with audio data processing is displayed on this display 15.

The HDD 16 is a large-capacity storage device.

The audio processing unit 17 includes a Digital/Analog (D/A) converter, an A/D converter, and an amplifier. The audio processing unit 17 converts an analog signal representing a sound received from the microphone 19 into digital data through the A/D converter and outputs the digital data to the controller 11. In addition, the audio processing unit 17 converts digital data representing a sound received from the controller 11 into an analog signal through the D/A converter and adjusts the amplitude of the analog signal through the amplifier and then outputs the analog signal to the speaker 18.

The speaker 18 emits a sound based on an analog signal received from the audio processing unit 17.

The microphone 19 outputs an analog signal representing a sound.

The virtual sound generation apparatus 1 is constructed as described above.

(B: Operation)

Reference will now be made to the operation of the virtual sound generation apparatus 1 constructed as described above.

(B-1: Overview of Processes)

An overview of the processes performed by the virtual sound generation apparatus 1 is given before a detailed description thereof is given.

The virtual sound generation apparatus 1 according to the invention is a simulation apparatus that simulates a sound generated by a virtual sound generator which is designed and developed based on a real existing sound generator. The following description of an example of the operation of the virtual sound generation apparatus 1 is given with reference to the case where a sound generated by a music keyboard under development, which will now be referred to as a "developed product," is predicted based on a music keyboard of a current model which will now be referred to as an "existing product." Namely, the developed product is a virtual sound generator.

Figure 2:
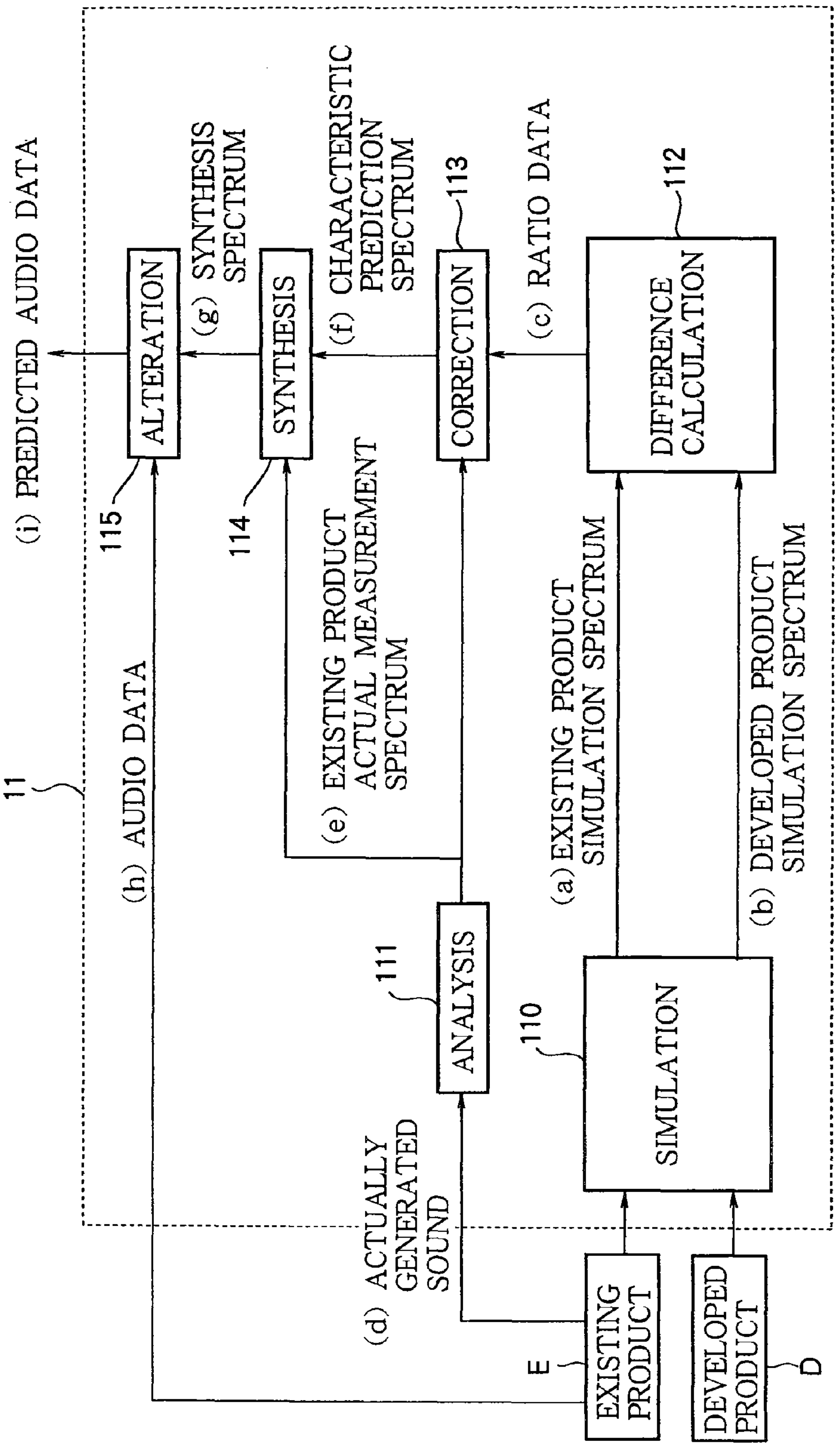
FIG. 2 is a block diagram illustrating a flow of processes performed by the virtual sound generation apparatus.

FIG. 2 conceptually illustrates a flow of processes that are performed by the virtual sound generation apparatus 1 according to the invention. In FIG. 2, a simulation part 110, an analysis part 111, a difference calculation part 112, a correction part 113, a synthesis part 114, and an alteration part 115 are implemented by the controller 11. The following description will be given with reference to letters (a) to (i) attached to the processes in FIG. 2.

First, the simulation part 110, which performs regular simulation, simulates sound generation characteristics (frequency response) of the existing product E and the developed product D and generates an existing product simulation spectrum (a) and a developed product simulation spectrum (b) representing the simulation results. Then, the difference calculation part 112 calculates ratio data (c) representing the difference between the existing product simulation spectrum (a) and the developed product simulation spectrum (b). On the other hand, an actual sound (d) is generated using the existing product E, and the analysis part 111 analyzes the actually generated sound to analyze the sound generation characteristic of the existing product E and generates an existing product actual measurement spectrum (e) as a result of the analysis. Then, the correction part 113 corrects the existing product actual measurement spectrum (e) based on the ratio data (c) to generate a new spectrum (i.e., a characteristic prediction spectrum) (f). The generated characteristic prediction spectrum (f) is data accurately predicting the sound generation characteristic of the developed product D since the characteristic prediction spectrum is generated by reflecting the difference between the simulation results of the existing product E and the developed product D in the sound generation characteristics obtained based on the actual sound (d) generated by the existing product E. The synthesis part 114 synthesizes the characteristic prediction spectrum (f) with a part of the existing product actual spectrum (e) to generate a synthesis spectrum (g). The alteration part 115 alters a sound (sound data) (h) generated by the existing product E based on the generated synthesis spectrum (g) to generate predicted sound data (i) that simulates the sound of the developed product D.

(B-2: Details of Processes)

Figures 3, 4:
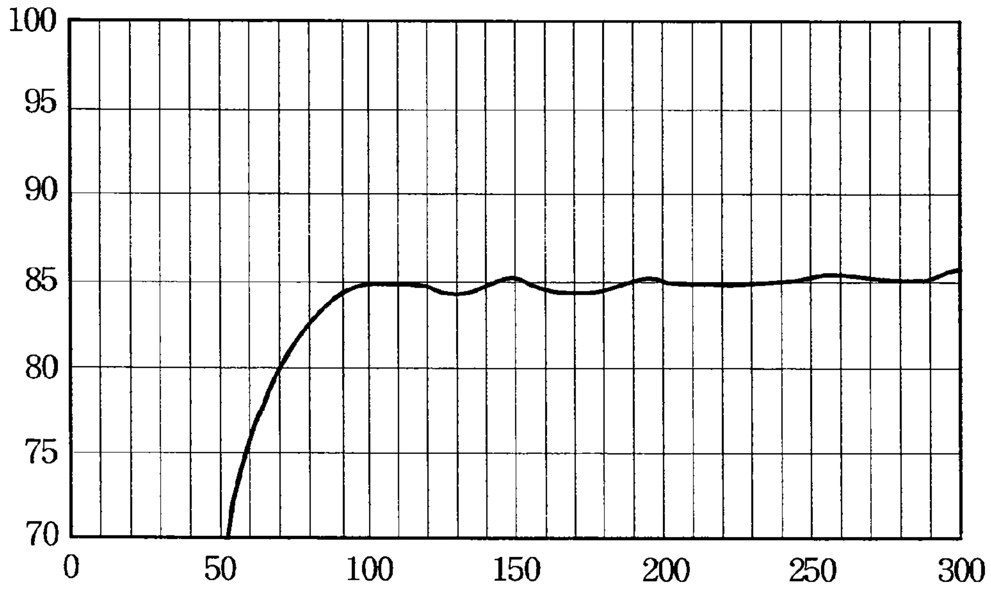
FIG. 3 is a flow chart illustrating processes performed by the virtual sound generation apparatus.
FIG. 4 illustrates an existing product simulation spectrum.

Reference will now be made to details of the processes performed by the virtual sound generation apparatus 1. FIG. 3 is a flow chart illustrating a flow of processes performed by the controller 11 of the virtual sound generation apparatus 1.

At step SA10, the controller 11 performs regular simulation of a sound generation characteristic (frequency response) of an existing product. The regular simulation includes calculation of a frequency response of a sound generated by the existing product by inputting a variety of conditions such as a constraint condition, a mount condition, and a coupling condition of a structure, a boundary condition such as a sound absorbing condition, a vibration condition of a sound source or a vibrating body, and a vibration attenuation coefficient of a structure. Specifically, the controller 11 generates a frequency spectrum representing the intensity of each frequency band of a sound that the existing product generates in response to sound data of, for example, white noise which has equal intensity in every frequency component.

FIG. 4 illustrates a frequency spectrum generated for the existing product through the regular simulation. This frequency spectrum will now be referred to as an "existing product simulation spectrum." In this embodiment, simulation is performed for frequency components equal to or less than 300 Hz.

A speaker part of a music keyboard is used as a target of the simulation with dimensions of width 300 mm, height 100 mm, and depth 150 mm. A boundary element method with 1105 elements and 1089 nodes is employed as a simulation method.

At step SA20, the controller 11 performs regular simulation of a sound generation characteristic (frequency response) of a developed product. Here, the same simulation method as that of step SA10 is employed.

Figure 5:
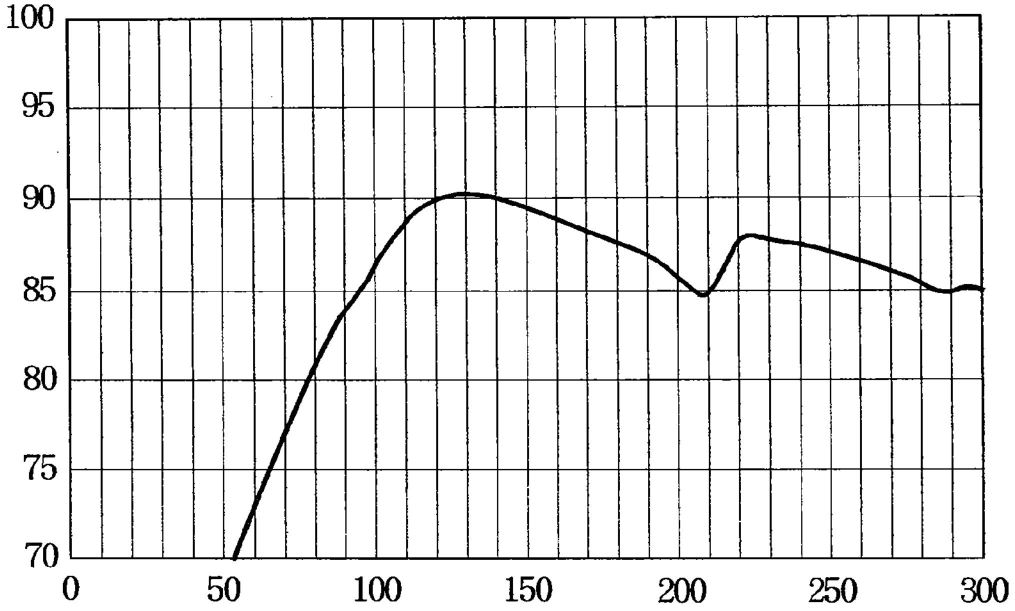
FIG. 5 illustrates a developed product simulation spectrum.

FIG. 5 illustrates a frequency spectrum generated for the developed product through the regular simulation. This frequency spectrum will now be referred to as a "developed product simulation spectrum." For this developed product simulation spectrum, simulation is also performed for frequency components equal to or less than 300 Hz.

Figure 6:
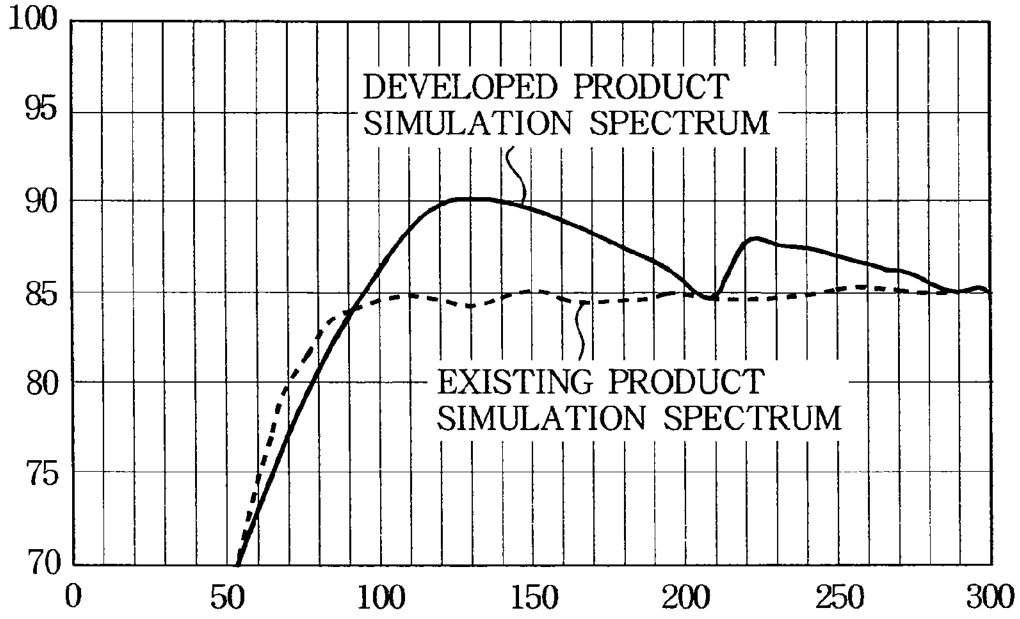
FIG. 6 illustrates an existing product simulation spectrum and a developed product simulation spectrum.

FIG. 6 illustrates respective frequency spectrums of the existing product and the developed product generated at step SA10 and step SA20. From the simulation results shown in FIG. 6, it can be predicted that frequency components of specific frequency bands of the developed product (100 Hz-200 Hz and 210 Hz-280 Hz) tend to be emphasized compared to those of the existing product.

Figure 7:
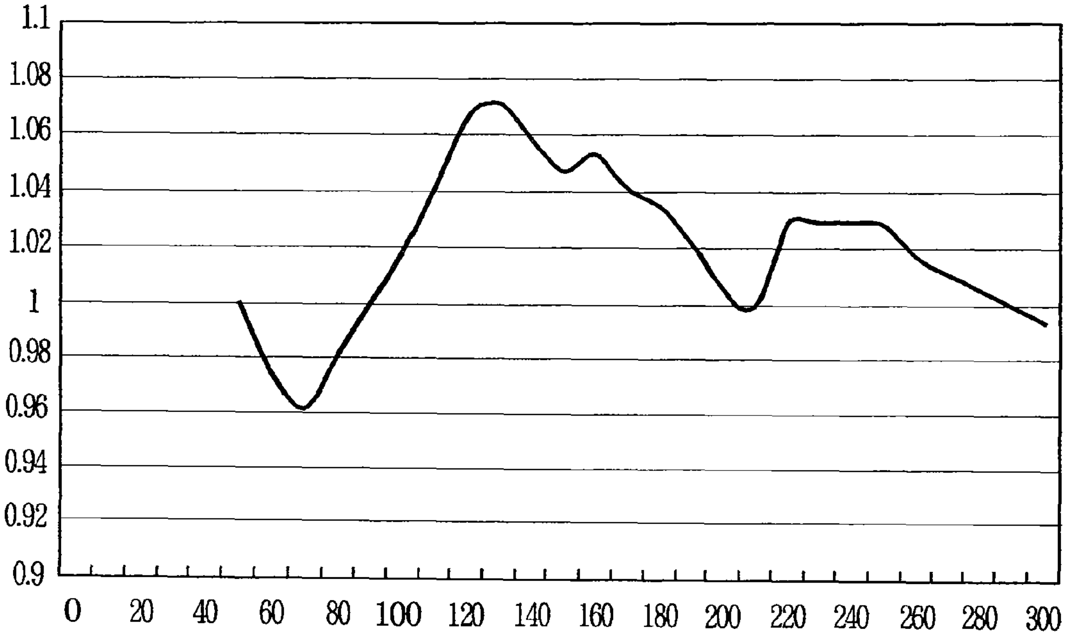
FIG. 7 illustrates ratio data.

At step SA30, the controller 11 generates "ratio data" as a numerical value representing the difference between the existing product and the developed product shown in FIG. 6. Specifically, the controller 11 divides a value of the developed product simulation spectrum by a value of the existing product simulation spectrum in each frequency band to calculate a ratio value. FIG. 7 illustrates the ratio data generated in this manner. A value of the ratio data higher than 1 in a frequency component indicates that the developed product is emphasized as compared to the existing product in the frequency component, whereas a value of the ratio data less than 1 indicates that the existing product is emphasized as compared to the developed product in the frequency component.

At step SA40, the controller 11 causes the existing product to generate a sound by actually inputting white noise and generates a frequency spectrum representing the amplitude of each frequency band of the generated sound. This frequency spectrum will now be referred to as an "existing product actual measurement spectrum."

Specifically, a sound generated by inputting white noise to the existing product is received, and audio data representing the received sound is Fourier-transformed to generate a power spectrum with respect to time. Then, a temporal average of the amplitude of the power spectrum in each frequency band is calculated. The existing product actual measurement spectrum is generated even for frequency bands equal to or greater than 300 Hz.

Figure 8:
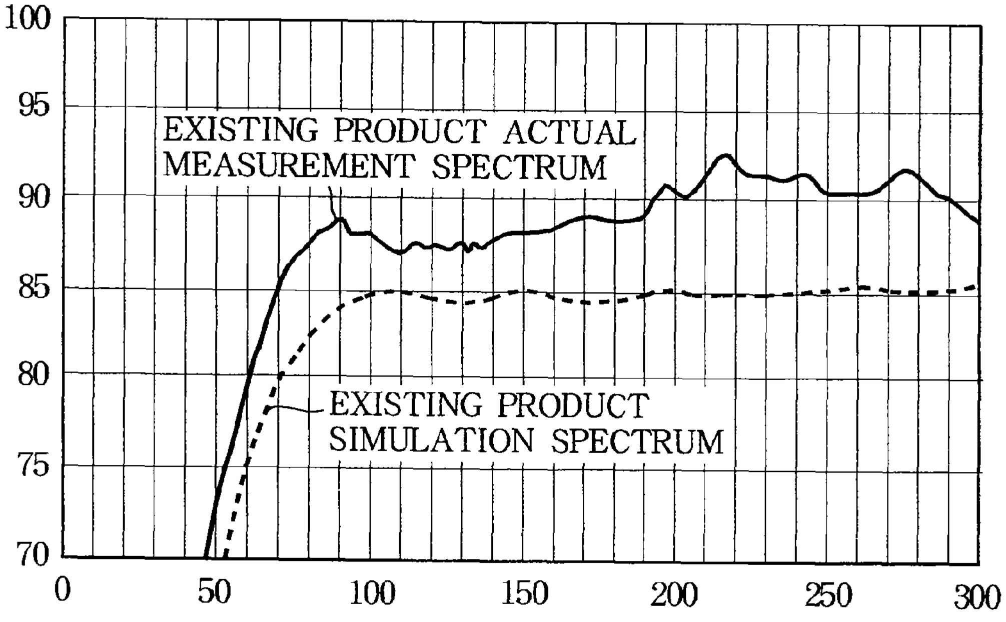
FIG. 8 illustrates an existing product simulation spectrum and an existing product actual measurement spectrum.

FIG. 8 illustrates the existing product simulation spectrum and the existing product actual measurement spectrum generated at step SA10 and step SA40, respectively. Here, the existing product actual measurement spectrum is illustrated only for frequency bands equal to or less than 300 Hz. Although the existing product simulation spectrum generally or qualitatively matches the existing product actual measurement spectrum, the absolute values of the existing product simulation spectrum deviate from those of the existing product actual measurement spectrum as can be seen from FIG. 8. This deviation results from errors such as an error occurring when a variety of conditions are set in the regular simulation or an error occurring when the existing product actual measurement spectrum is obtained.

At step SA50, the controller 11 corrects the existing product actual measurement spectrum obtained at step SA40 by adding the ratio data generated at step SA30 to the existing product actual measurement spectrum obtained at step SA40 and generates a new frequency spectrum, which will now be referred to as a "characteristic prediction spectrum." That is, a value of a corresponding frequency band in the ratio data is added to a value of each frequency band of the existing product actual measurement spectrum to generate the characteristic prediction spectrum.

Figure 9:
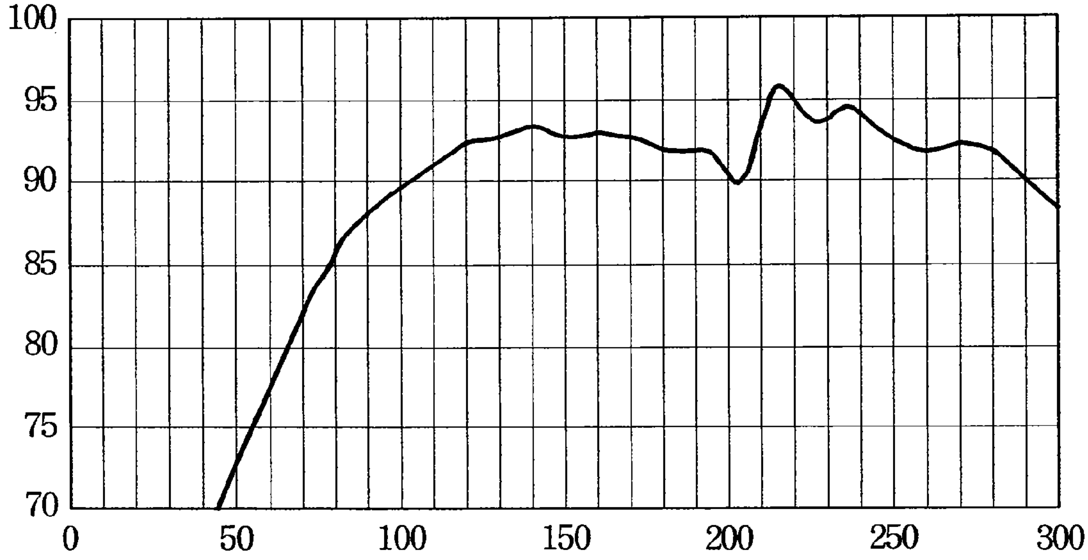
FIG. 9 illustrates a characteristic prediction spectrum.

FIG. 9 illustrates the characteristic prediction spectrum generated in this manner. Frequency components of 100 Hz-200 Hz and 210 Hz-280 Hz of the existing product actual measurement spectrum shown in FIG. 8 are emphasized in this characteristic prediction spectrum. These emphasized frequency components correspond to frequency bands whose values are higher than 1 in the ratio data in FIG. 7.

Figure 10:
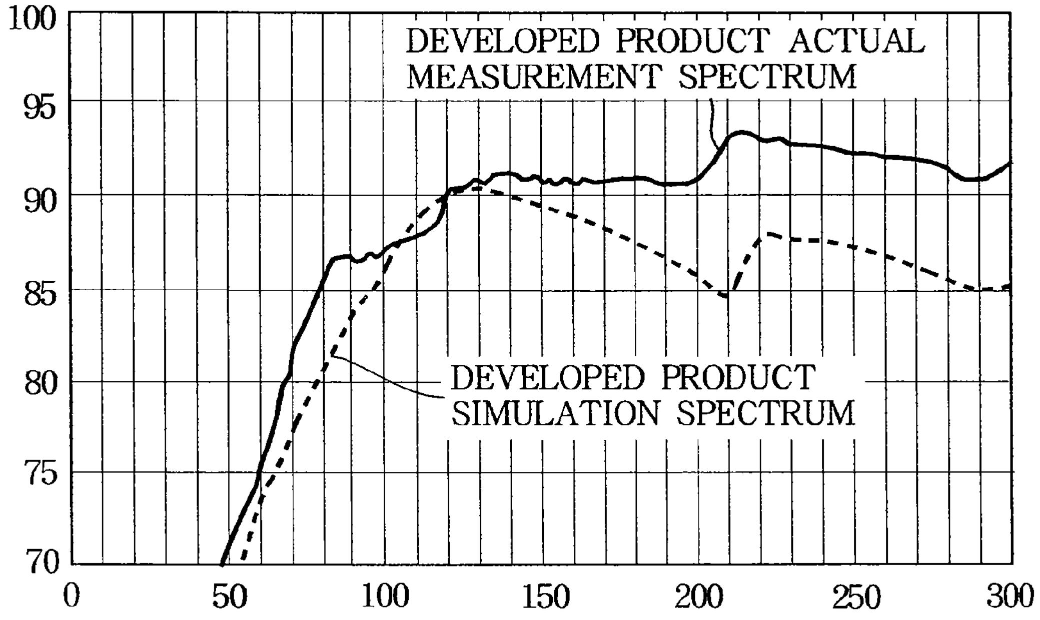
FIG. 10 illustrates a developed product simulation spectrum and a developed product actual measurement spectrum.

The characteristic prediction spectrum is briefly summarized as follows. FIG. 10 illustrates a developed product simulation spectrum and a developed product actual measurement spectrum. The developed product actual measurement spectrum is a frequency spectrum that is generated for a developed product in the same manner as that of the existing product actual measurement spectrum. Although it is assumed in the invention that a developed product is not yet present since the object of the invention is to predict an acoustic characteristic of a developed product before it is manufactured, FIG. 10 illustrates a developed product actual measurement spectrum of a product that has completed the development in order to check the accuracy of the characteristic prediction spectrum for prediction of the acoustic characteristic of the developed product.

Although the developed product simulation spectrum generally or qualitatively matches the developed product actual measurement spectrum, the absolute values of the developed product simulation spectrum deviate from those of the developed product actual measurement spectrum as can be seen from FIG. 10. Similar to the deviation between the existing product simulation spectrum and the existing product actual measurement spectrum described above with reference to FIG. 8, this deviation results from errors such as an error occurring when a variety of conditions are set in the regular simulation or an error occurring when the developed product actual measurement spectrum is obtained.

Figure 11:
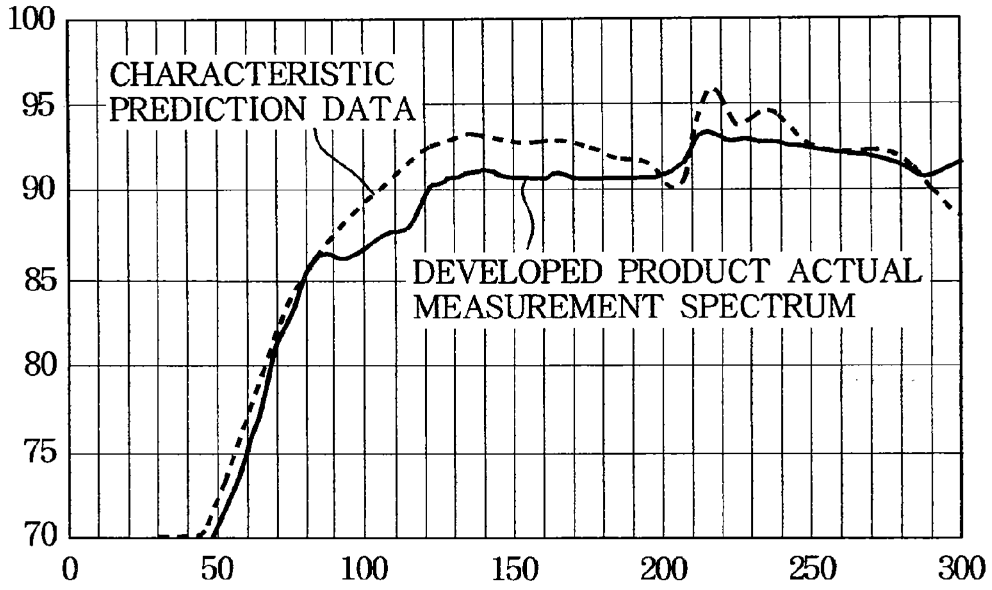
FIG. 11 illustrates a characteristic prediction spectrum and a developed product actual measurement spectrum.

FIG. 11 illustrates a characteristic prediction spectrum and a developed product actual measurement spectrum. From FIG. 11, it can be seen that the characteristic prediction spectrum more accurately predicts the developed product actual measurement spectrum than the developed product simulation spectrum (shown in FIG. 10) generated through regular simulation.

Figure 12:
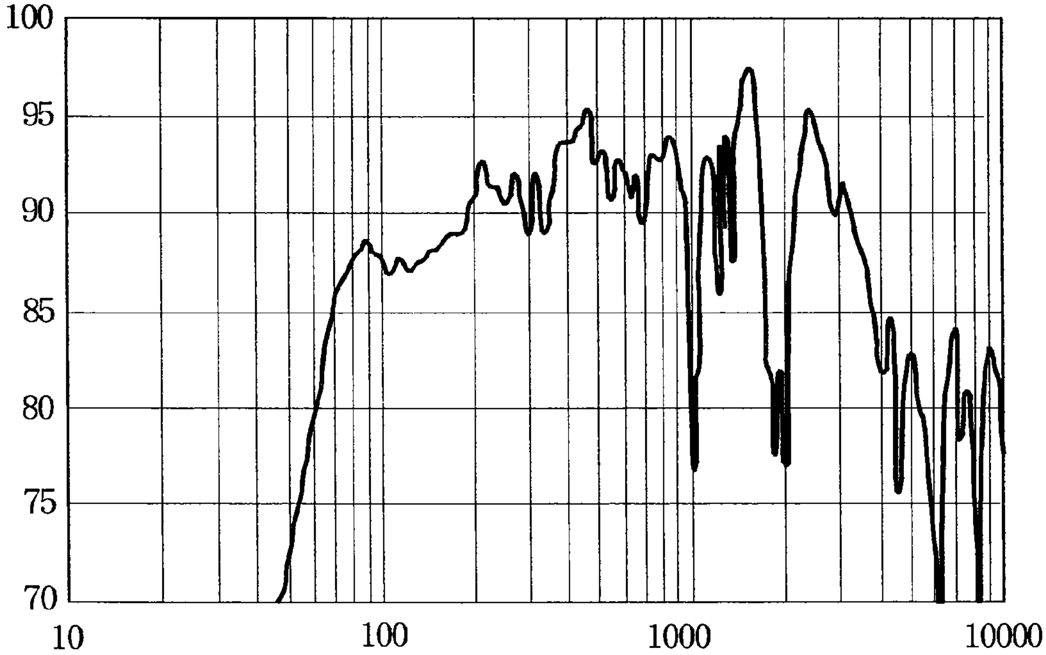
FIG. 12 illustrates an existing product actual measurement spectrum.

While FIG. 8 illustrates the existing product actual measurement spectrum only for frequency components equal to or less than 300 Hz, FIG. 12 illustrates an existing product actual measurement spectrum for all frequencies with a logarithmic horizontal axis.

At step SA60, the controller 11 synthesizes the characteristic prediction spectrum with the existing product actual measurement spectrum shown in FIG. 12. That is, the controller 11 generates a new frequency spectrum (hereinafter referred to as a "synthesis spectrum") by combining a part of the characteristic prediction spectrum which is equal to or less than 300 Hz with a part of the existing product actual measurement spectrum which is higher than 300 Hz.

Figure 13:
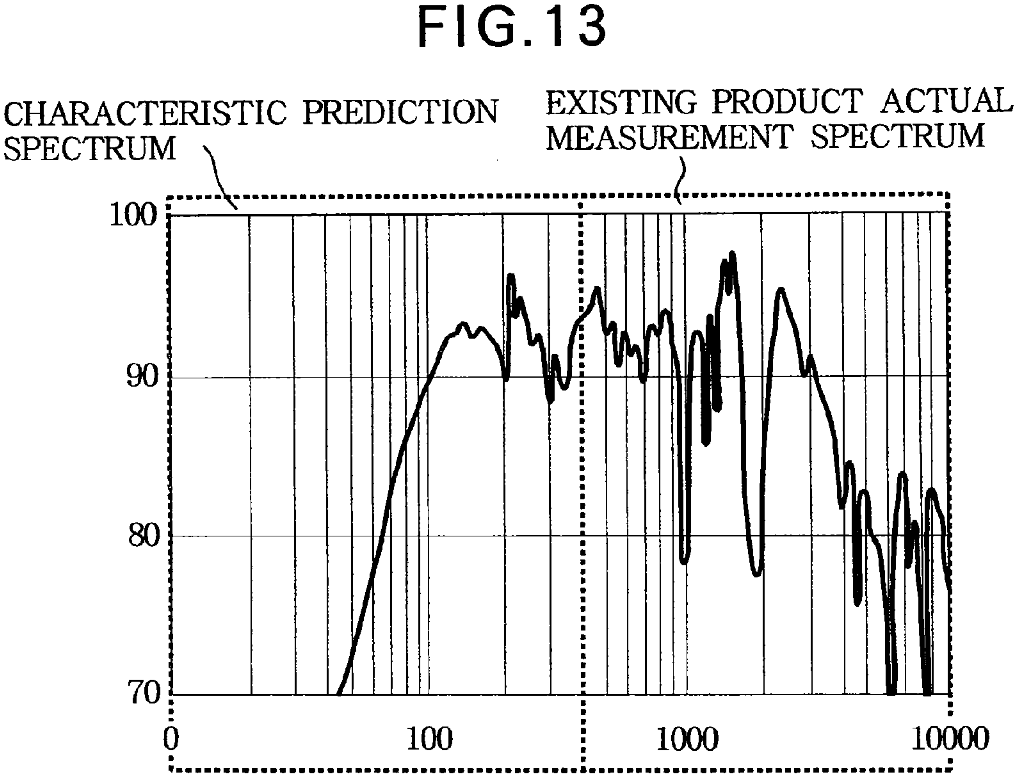
FIG. 13 illustrates a synthesis spectrum.
Figure 14:
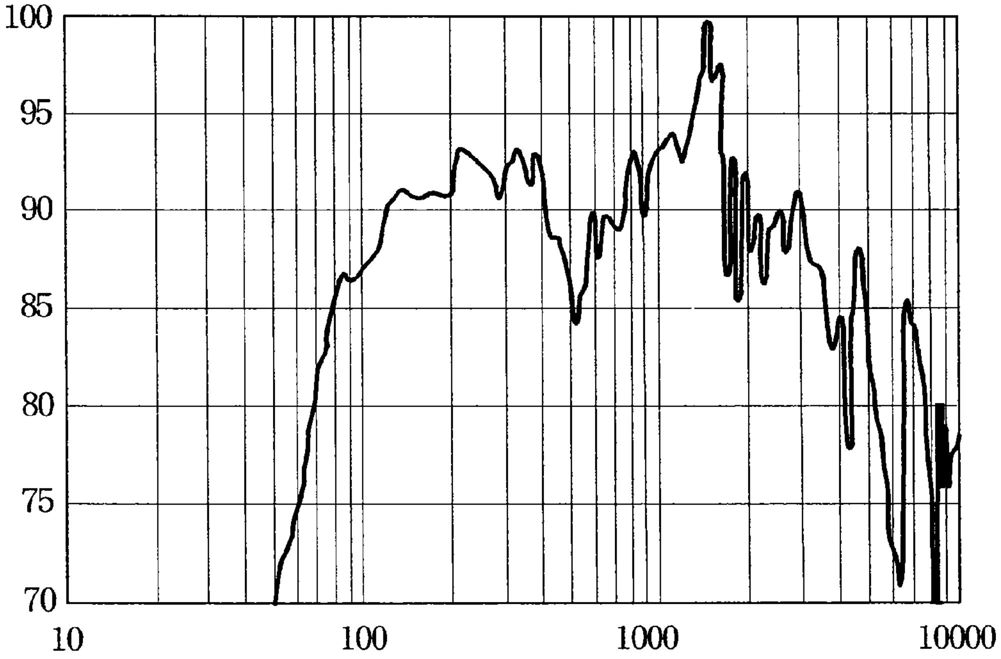
FIG. 14 illustrates a developed product actual measurement spectrum.

FIG. 13 illustrates the generated synthesis spectrum. FIG. 14 illustrates the developed product actual measurement spectrum shown in FIG. 11 for all frequencies. When FIGS. 13 and 14 are compared, it can be seen that the synthesis spectrum accurately predicts the developed product actual measurement spectrum, especially a low frequency band thereof.

At step SA70, the controller 11 receives audio data representing a sound generated by a sound source embedded in the existing product through the microphone 19. Here, an arbitrary performance may be played using a music keyboard as the existing product and the played sound may be received through the microphone 19.

At step SA80, the controller 11 adds the synthesis spectrum generated at step SA60 to the audio data received at step SA70 to generate predicted audio data representing a sound (predicted sound) that is predicted to be generated from the developed product and then outputs the generated predicted audio data to the audio processing unit 17. The audio processing unit 17 converts the received predicted audio data into an analog signal and causes the speaker 18 to emit a corresponding sound. The emitted sound has acoustic characteristics that have been converted such that the emitted sound is heard as if the same performance as played by the existing product at step SA70 were played by the developed product.

(B-3: Summary)

The following is a summary of the above processes. In the regular simulation, errors from ideal values occur in parameters that are input during setting of a variety of conditions or parameters. Such errors result from complicated structures or the like of the existing product and the developed product. There are limits to reduction of the errors by controlling parameters.

The invention performs a process for calculating a difference (ratio) between acoustic characteristics (frequency spectrums) of the existing product and the developed product through the regular simulation. Since this process is to generate the difference between simulation results of the existing product and the developed product, most errors occurring during setting of the simulation are canceled out. On the other hand, no cancellation occurs in the difference between the existing product and the developed product. As a result, data (ratio data) accurately indicating the difference between the existing product and the developed product is generated. Then, the existing product actual measurement spectrum is corrected based on the ratio data to generate the characteristic prediction spectrum that accurately predicts the developed product actual measurement spectrum. Finally, the characteristic prediction spectrum is added to audio data generated by the existing product, thereby enabling conversion of the audio data of the existing product into audio data simulating a sound of the developed product. The audio data generated in this manner has a small aural difference from a sound generated by a real sound generator and enables appropriate estimation of a sound generated by a virtual sound generator.

Although the characteristic prediction spectrum generated for frequency components equal to or less than 300 Hz is used to predict a sound from the developed product in this embodiment, the characteristic prediction spectrum may also be generated for frequency components higher than 300 Hz.

In addition, the simulation method may be appropriately selected from a variety of methods such as a difference method, a boundary element method, and a finite element method according to calculation conditions such as calculation accuracy, calculation time, and calculation capacity.

(C: Modified Embodiments)

While the embodiment of the invention has been described, the invention may also be carried out in various modifications as follows. The following various embodiments may also be appropriately combined and carried out.

Figure 15:
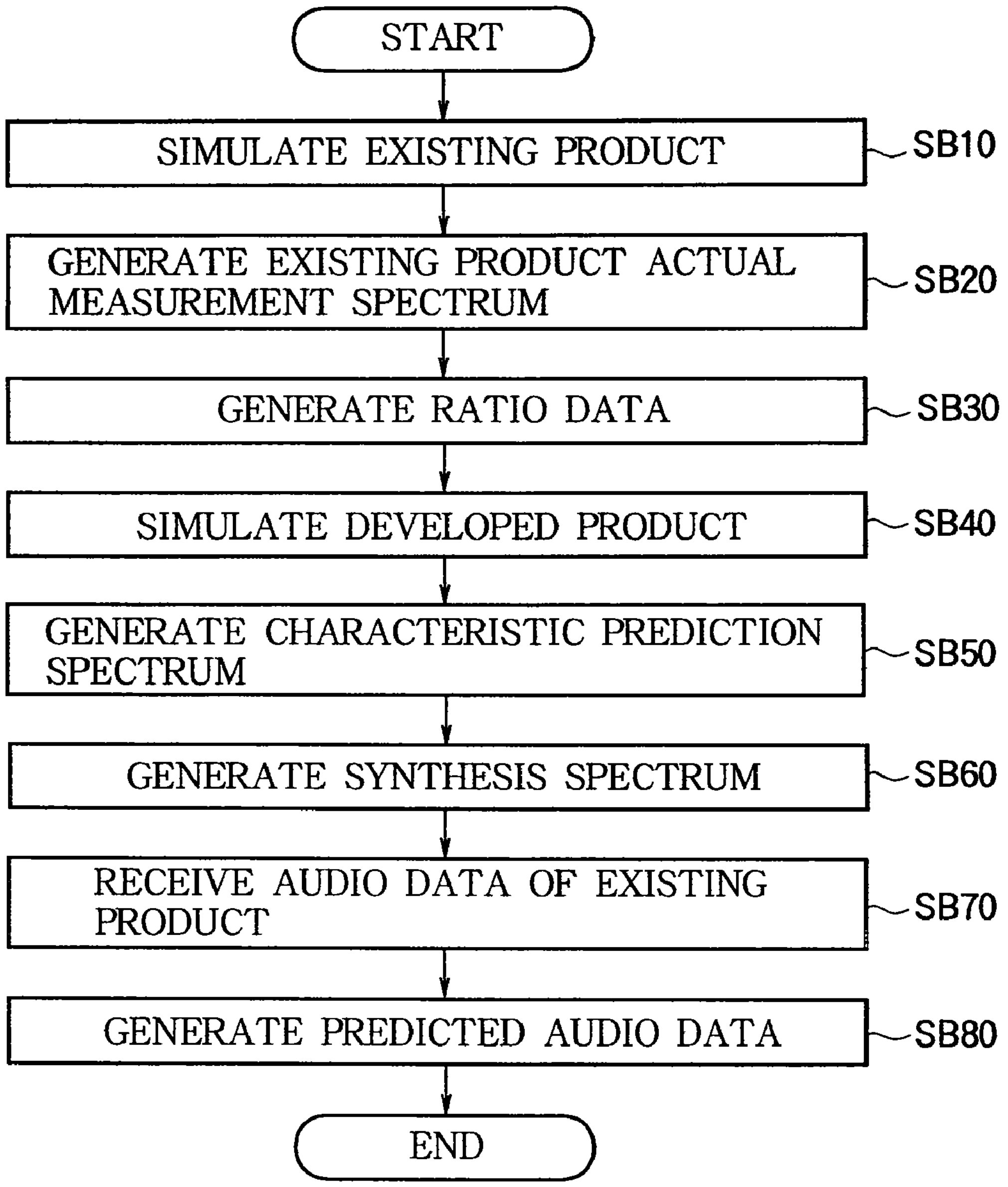
FIG. 15 is a flow chart illustrating processes performed by a virtual sound generation apparatus according to a modified embodiment (1).
Figure 16:
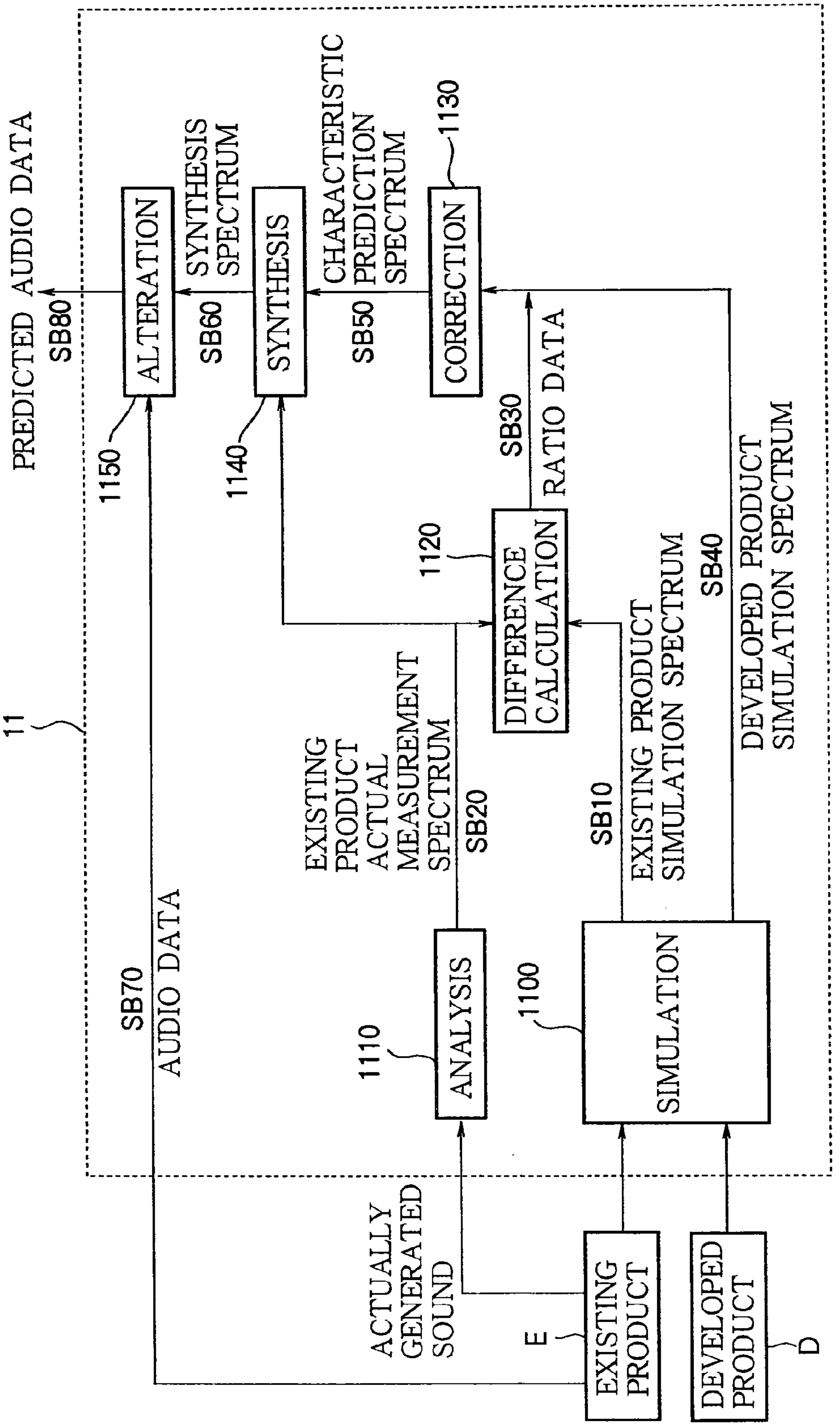
FIG. 16 is a block diagram illustrating a flow of processes by the virtual sound generation apparatus according to the modified embodiment (1).

(1) The above embodiment has been described with reference to the case where the actual measurement spectrum of the existing product is corrected based on the difference between the existing product simulation spectrum and the developed product simulation spectrum to generate the characteristic prediction spectrum that is data predicting the developed product actual measurement spectrum. However, the characteristic prediction spectrum may also be generated by processing the existing product simulation spectrum, the developed product simulation spectrum, and the existing product actual measurement spectrum using an algorithm described below. The following is an overview of processes performed in this case. The description of the overview will be given with reference to the case where processes are performed according to a flow chart shown in FIG. 15 as an example. Reference will also be made to FIG. 16 that conceptually illustrates a flow of processes. A simulation part 1100, an analysis part 1110, a difference calculation part 1120, a correction part 1130, a synthesis part 1140, and an alteration part 1150 shown in FIG. 16 are implemented using the controller 11.

First, the simulation part 1100 simulates a sound generation characteristic of an existing product E and generates an existing product simulation spectrum (step SB10). An actual sound is generated using the existing product E. The analysis part 1110 analyzes the actually generated sound and generates an existing product simulation spectrum (step SB20). A detailed description of steps SB10 and SB20 is omitted herein since the processes of steps SB10 and SB20 are similar to those of steps SA10 and SA40 described in the above embodiment.

Then, at step SB30, the difference calculation part 1120 compares the existing product actual measurement spectrum with the existing product simulation spectrum, and calculates ratio data representing the difference therebetween. The ratio data is generated based on a ratio value obtained by dividing a value of the developed product simulation spectrum by a value of the existing product simulation spectrum in each frequency band.

Then, at step SB40, the simulation part 1100 simulates a sound generation characteristic of a developed product D and generates a developed product simulation spectrum. A detailed description of step SB40 is omitted herein since the processes of step SB40 are similar to those of step SA20 described in the first embodiment.

At step SB50, the correction part 1130 corrects the developed product simulation spectrum generated at step SB40 using the ratio data generated at step SB30 to generate a new frequency spectrum (characteristic prediction spectrum). A detailed description of this correction method is omitted herein since it is similar to that of step SA50 described in the first embodiment.

The generated characteristic prediction spectrum accurately predicts the developed product actual measurement spectrum since the characteristic prediction spectrum is generated by reflecting a difference between simulation and actual measurement (i.e., an error due to the simulation), which has been found for the existing product, in the sound generation characteristic obtained through simulation of the developed product D.

Then, at step SB60, the synthesis part 1140 synthesizes the characteristic prediction spectrum with a part of the existing product actual measurement spectrum to generate a new frequency spectrum (i.e., a synthesis spectrum). Then, at step SB70, a sound is actually generated using the existing product to obtain audio data. At step SB80, the alteration part 1150 alters the audio data based on the synthesis spectrum to generate predicted audio data.

In the processing method of the first embodiment and the processing method illustrated in this modified embodiment (1), different characteristic prediction spectrums are generated or different predicted audio data of the developed product are obtained even when the processing is performed on the same existing and developed products. Thus, the user may be allowed to select the processing method of the first embodiment or the processing method illustrated in this modified embodiment (1). For example, the user may select one of the processing methods according to the material and shape of the existing product or the developed product, and may also select one of the processing methods according to the settings of the regular simulation used to generate the existing product simulation spectrum or the developed product simulation spectrum. Predicted audio data generated according to the two methods may also be output together.

(2) The first embodiment has been described with reference to the case where, to generate the difference data, a ratio value is calculated by dividing a value of the developed product simulation spectrum by a value of the existing product simulation spectrum in each frequency band. However, the difference data may also be generated by calculating a mathematically differential value (subtraction value) between a value of the developed product simulation spectrum and a value of the existing product simulation spectrum in each frequency band. A spectrum obtained by multiplying the ratio value (divisional value) or the differential value (subtraction value) at each frequency by a specific coefficient may also be used as the difference data.

(3) The above embodiment has been described with reference to the case where the existing product actual measurement spectrum is generated based on an actual sound received from the existing product through the microphone 19. However, when the existing product actual measurement spectrum has already been acquired, the spectrum may be stored in a storage means such as the ROM 12, the RAM 13, the HDD 16 and then may be used appropriately.

(4) The above embodiment has been described with reference to the case where the existing product is allowed to generate a white noise sound and the generated sound is received through the microphone 19 and is then analyzed to generate the existing product actual measurement spectrum. However, the generated sound is not limited to the white noise sound and a different sound may be generated to generate the existing product actual measurement spectrum.

(5) The above embodiment has been described with reference to the case where the invention is used to predict a sound generated by an electronic musical instrument (for example, a music keyboard) under development. However, the invention is not limited to prediction of a sound generated by an electronic musical instrument. For example, the invention may be applied to other sound generating bodies such as a game machine, a speaker device, and a mobile phone and may also be used to estimate a sound generated by an object that is not designed to generate sound, such as a sound generated when a golf club strikes a ball, a camera shutter sound, or wind noise at a side mirror of a vehicle.

(6) Although the above embodiment has been described with reference to the case where the control program for implementing characteristic functions in the virtual sound generation apparatus 1 according to the invention has already been written to the ROM 12, the control program may also be recorded and distributed on a computer readable recording medium such as a magnetic tape, a magnetic disk, a floppy disk, an optical recording medium, a magneto-optical recording medium, a RAM, or a ROM. The control program may also be distributed through downloading over a communication link such as the Internet.

(7) The above embodiment has been described with reference to the case where simulation is performed on a frequency response of a sound generated by the developed product. However, simulation may also be performed on other characteristics of a sound generated by the developed product.

For example, simulation may be performed on an attenuation characteristic of the amplitude of a sound. An embodiment of this case is briefly described below. The virtual sound generation apparatus 1 has the same configuration as that of the above embodiment, except for the control program stored in the ROM 12.

In this embodiment, processes are performed as follows. First, simulation is performed on respective attenuation characteristics of the amplitude of the existing product and the developed product according to a regular simulation method. For example, the attenuation characteristics of the amplitude of the existing product and the developed product are simulated in such a manner that the attenuation of a sound generated by the existing product is relatively slow since a casing of the music keyboard of the existing product has a large void therein and the attenuation of a sound generated by the developed product is relatively fast since a casing of the music keyboard of the developed product has a small void therein. Then, a difference (or ratio) of attenuation characteristic waveforms obtained through simulation between the existing product and the developed product is calculated. On the other hand, the existing product is allowed to actually generate a sound and an attenuation characteristic of the sound generated by the existing product is measured. Then, the attenuation characteristic of the sound generated by the existing product is corrected based on the difference (or ratio) between the attenuation characteristic waveforms to generate a new attenuation characteristic waveform. The generated attenuation characteristic waveform is data accurately predicting the attenuation characteristic of the sound generated by the developed product since the attenuation characteristic waveform is generated by reflecting the attenuation characteristic waveform difference between the existing product and the developed product, which has been found through simulation, in the attenuation characteristic of the sound generated by the existing product. Thereafter, the amplitude of the sound generated by the existing product is altered based on the generated attenuation characteristic waveform to generate audio data having an attenuation characteristic similar to that of the developed product. The process for controlling the attenuation characteristic of the amplitude described above may be performed together with simulation of the frequency response of the above embodiment.

Simulation may also be performed on a phase characteristic of a sound. Amplitude and phase information can be extracted from a frequency response obtained through simulation and actual measurement. That is, when the frequency response is expressed as a complex number, the amplitude is calculated as an absolute value of the complex number and the phase is calculated as the arctangent of a ratio between the imaginary part and real part of the complex number. A phase characteristic of the sound generated by the developed product may be simulated using simulation results of the existing product and the developed product and actual measurement results of the existing product to generate a sound having a phase characteristic similar to that of the sound generated by the developed product.

(8) The above embodiment has been described with reference to the case where simulation is performed on sound generation characteristics of the entirety of a music keyboard which is a system including a plurality of units. However, a sound generation characteristic of each unit of the sound generator may first be simulated using the simulation method according to the invention and the simulation result may then be used to simulate a sound generation characteristic of the entire system. The following is a description of detailed examples.

EXAMPLE 1

The music keyboard includes a plurality of units such as a speaker (sound generator), which is a unit that itself generates a sound based on an input sound signal and a speaker cabinet or a music keyboard cabinet, which is a unit (structure) that does not itself generate a sound but instead is acoustically connected to the sound generator to deliver or transmit a sound of the sound generator. Thus, a sound generation characteristic of the speaker may be simulated using the simulation method according to the invention, an actual measurement result or a best simulation result obtained through other simulation part may be employed for each unit other than the speaker, and these results may then be combined to estimate a sound generation characteristic of the system (i.e., the music keyboard) which is a compound body including the sound generator and the acoustic structure. For example, when it is determined from actual measurement that the speaker cabinet and the music keyboard cabinet tend to reduce high frequency components, a sound generation characteristic (frequency response) of the speaker obtained by applying the simulation method of the invention to the speaker, with a change made to a high frequency part of the sound generation characteristic, may be simulated as a sound generation characteristic of a music keyboard (which is a complex body including the sound generator and the acoustic structure) in which a virtual speaker is embedded.

EXAMPLE 2

The above combination-based simulation method may also be applied as follows. For example, let us assume that a virtual music keyboard (sound generator) whose sound generation characteristics have been found according to the above embodiment is installed in an existing or virtual acoustic space (acoustic structure). In this case, a transfer characteristic of sound of the acoustic space may be obtained through actual measurement or other simulation method and then may be combined with the sound generation characteristic of the music keyboard obtained using the simulation method according to the invention to estimate a leakage sound of the music keyboard leaking out of the acoustic space (compound body) in which the music keyboard is installed. For example, when it is determined through the regular simulation method that the virtual acoustic space tends to reduce high frequency components, a sound generation characteristic (frequency response) of the music keyboard obtained according to the simulation method of the invention, with a change made to a high frequency part of the sound generation characteristic, may be determined to be the sound generation characteristic of the virtual acoustic space in which the virtual music keyboard is installed (i.e., the characteristic of a sound leaking out of the virtual acoustic space).

EXAMPLE 3

The above examples 1 and 2 have been described with reference to the case where the sound generation characteristic of the entire system is estimated by combining the simulation method according to the invention with actual measurement or other simulation method. However, a plurality of simulation methods according to the invention may also be combined to simulate a new sound generation characteristic. For example, simulation may be performed as follows in the case where a virtual music keyboard (sound generator) is installed in a virtual acoustic space (acoustic structure).

First, a "transfer characteristic" of sound of the virtual acoustic space is simulated using a simulation method to which the invention is applied as illustrated in the following methods A and B.

(Method A) Transfer characteristics (frequency responses) of sound of existing and virtual acoustic spaces are simulated according to the regular simulation method. On the other hand, a sound source of white noise is installed in the existing acoustic space and a sound leaking out of the existing acoustic space is collected to measure a transfer characteristic of sound of the existing acoustic space. Then, a transfer characteristic of the virtual acoustic space is simulated by correcting the measured transfer characteristic of the existing acoustic space by a ratio between simulation results of the virtual and existing acoustic spaces.

(Method B) Transfer characteristics (frequency responses) of sound of existing and virtual acoustic spaces are simulated according to the regular simulation method. On the other hand, a sound source of white noise is installed in the existing acoustic space and a sound leaking out of the existing acoustic space is detected to measure a transfer characteristic of sound of the existing acoustic space. Then, a transfer characteristic of the virtual acoustic space is simulated by correcting a simulation result of the virtual acoustic space by a ratio between the measured transfer characteristic of the existing acoustic space and a simulation result of the existing acoustic space.

A sound generation characteristic of the music keyboard is also separately simulated using the simulation method described in the above embodiment. Then, a characteristic of a sound emitted (leaked) from a virtual acoustic space (compound body) in which a virtual music keyboard is installed can be simulated by combining the sound generation characteristic of the music keyboard with the transfer characteristic of the acoustic space simulated using the method A or B.

In the simulation method described above, simulation according to the invention is performed on one or a plurality of units (an acoustic space and a music keyboard in this case) which constitute a system and a sound generation characteristic of the entirety of the system (i.e., the acoustic space including the music keyboard) is simulated based on a result of the simulation.

In the above description, a speaker cabinet of a music keyboard or a keyboard cabinet or an acoustic space (room) in which a sound generator is installed is given as an example of the "acoustic structure." The acoustic structure has a void structure or alternatively the compound body has a void when the acoustic structure and the sound generator constitute the compound body. Accordingly, it can be considered that effects due to propagation of a sound through the air are included in the sound generation characteristic of the entirety of the compound body. However, the "sound structure" is not limited to a structure that transmits or propagates a sound through the air. The acoustic structure described above may also be a structure that propagates a sound generated by a sound generator as a solid-borne sound through vibration of the structure. Examples of the acoustic structure include a shaft supporting a sound generator or a concrete floor. The simulation method according to the invention can also be applied, for example when it is difficult to perform simulation incorporating a complicated installation or mount state of a sound generator such as a music keyboard installed on a floor, a speaker mounted or supported by a shaft, or a game machine installed in a space.

In the case where a sound generation characteristic of the entirety of the system is estimated when only a specific unit included in the system has been replaced, the entirety of the system can be simulated simply by simulating a sound generation characteristic of only the replaced unit. It is also possible to apply the simulation method according to the invention to a unit (for example, a periphery of a speaker), which requires especially precise simulation while applying a simple simulation method to other units.

What is claimed is:

1. A simulation apparatus comprising:

an existing sound generator simulation part that simulates a sound generation characteristic of an existing sound generator and that provides a simulation result;

a virtual sound generator simulation part that simulates a sound generation characteristic of a virtual sound generator and that provides a simulation result;

an existing sound generator measurement part that measures the sound generation characteristic of the existing sound generator when the existing sound generator actually generates a sound and that provides a measurement result;

a difference data generation part that compares the simulation result of the existing sound generator with the simulation result of the virtual sound generator, and that generates difference data representing a difference between the simulation result of the existing sound generator and the simulation result of the virtual sound generator; and a characteristic correction part that corrects the measurement result of the existing sound generator based on the difference data, and that generates virtual sound generator prediction data representing the sound generation characteristic of the virtual sound generator according to the corrected measurement result of the existing sound generator.

2. The simulation apparatus according to claim 1, wherein the existing sound generator simulation part simulates a frequency response as the sound generation characteristic of the existing sound generator, the virtual sound generator simulation part simulates a frequency response as the sound generation characteristic of the virtual sound generator, the difference data generation part calculates the difference between the simulated frequency response of the existing sound generator and the simulated frequency response of the virtual sound generator, and the existing sound generator measurement part measures the frequency response of the existing sound generator when the existing sound generator actually generates a sound.

3. The simulation apparatus according to claim 1, wherein the existing sound generator simulation part simulates a phase characteristic as the sound generation characteristic of the existing sound generator, the virtual sound generator simulation part simulates a phase characteristic as the sound generation characteristic of the virtual sound generator, the difference data generation part calculates the difference between the simulated phase characteristic of the existing sound generator and the simulated phase characteristic of the virtual sound generator, and the existing sound generator measurement part measures the phase characteristic of the existing sound generator when the existing sound generator actually generates a sound.

4. The simulation apparatus according to claim 1, further comprising:

a receiving part that receives audio data representing a sound generated by the existing sound generator; and an audio data alteration part that alters the audio data received by the receiving part based on the virtual sound generator prediction data, and that outputs the altered audio data.

5. The simulation apparatus according to claim 1, further comprising:

a transfer characteristic simulation part that simulates a transfer characteristic of a sound of an acoustic structure that is associated with the virtual sound generator, and that provides a simulation result of the transfer characteristic of the acoustic structure; and a prediction data correction part that corrects the virtual sound generator prediction data based on the simulation result of the acoustic structure, and that predicts a composite sound generation characteristic of a combination of the virtual sound generator and the acoustic structure where the virtual sound generator generates the sound and the acoustic structure transfers the generated sound.

6. The simulation apparatus according to claim 1, further comprising:

a transfer characteristic measurement part that measures a transfer characteristic of a sound of an acoustic structure that is associated with the virtual sound generator, and that provides a measurement result of the transfer characteristic of the acoustic structure; and a prediction data correction part that corrects the virtual sound generator prediction data based on the measurement result of the acoustic structure, and that predicts a composite sound generation characteristic of a combination of the virtual sound generator and the acoustic structure where the virtual sound generator generates the sound and the acoustic structure transfers the generated sound.

7. The simulation apparatus according to claim 1, further comprising:

an existing acoustic structure simulation part that simulates a transfer characteristic of a sound of an existing acoustic structure and that provides a simulation result of the existing acoustic structure;

a virtual acoustic structure simulation part that simulates a transfer characteristic of a sound of a virtual acoustic structure and that provides a simulation result of the virtual acoustic structure;

an existing acoustic structure measurement part that measures the transfer characteristic of the existing acoustic structure when the existing acoustic structure transfers a sound and that provides a measurement result of the existing acoustic structure;

another difference data generation part that compares the simulation result of the existing acoustic structure with the simulation result of the virtual acoustic structure, and that generates difference data representing a difference between the simulation result of the existing acoustic structure and the simulation result of the virtual acoustic structure;

another characteristic correction part that corrects the measurement result of the existing acoustic structure based on the difference data, and that generates virtual acoustic structure prediction data representing the transfer characteristic of the sound of the virtual acoustic structure according to the corrected measurement result of the existing acoustic structure; and a prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

8. The simulation apparatus according to claim 1, further comprising:

an existing acoustic structure simulation part that simulates a transfer characteristic of a sound of an existing acoustic structure and that provides a simulation result of the existing acoustic structure;

a virtual acoustic structure simulation part that simulates a transfer characteristic of a sound of a virtual acoustic structure and that provides a simulation result of the virtual acoustic structure;

an existing acoustic structure measurement part that measures the transfer characteristic of the existing acoustic structure when the existing acoustic structure transfers a sound;

another difference data generation part that compares the simulation result of the existing acoustic structure with the measurement result of the existing acoustic structure, and that generates difference data representing a difference between the simulation result of the existing acoustic structure and the measurement result of the existing acoustic structure;

another characteristic correction part that corrects the simulation result of the virtual acoustic structure based on the difference data, and that generates virtual acoustic structure prediction data representing the transfer characteristic of the sound of the virtual acoustic structure according to the corrected simulation result of the virtual acoustic structure; and a prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

9. A simulation apparatus comprising:

an existing sound generator simulation part that simulates a sound generation characteristic of an existing sound generator and that provides a simulation result;

a virtual sound generator simulation part that simulates a sound generation characteristic of a virtual sound generator and that provides a simulation result;

an existing sound generator measurement part that measures the sound generation characteristic of the existing sound generator when the existing sound generator actually generates a sound and that provides a measurement result;

a difference data generation part that compares the simulation result of the existing sound generator with the measurement result of the existing sound generator, and that generates difference data representing a difference between the simulation result of the existing sound generator and the measurement result of the existing sound generator; and a characteristic correction part that corrects the simulation result of the virtual sound generator based on the difference data, and that generates virtual sound generator prediction data representing the sound generation characteristic of the virtual sound generator according to the corrected simulation result of the virtual sound generator.

10. The simulation apparatus according to claim 9, wherein the existing sound generator simulation part simulates a frequency response as the sound generation characteristic of the existing sound generator, the existing sound generator measurement part measures the frequency response of the existing sound generator when the existing sound generator actually generates a sound, and the difference data generation part calculates the difference between the simulated frequency response of the existing sound generator and the measured frequency response of the existing sound generator.

11. The simulation apparatus according to claim 10, further comprising:

an existing acoustic structure simulation part that simulates a transfer characteristic of a sound of an existing acoustic structure and that provides a simulation result of the existing acoustic structure;

a virtual acoustic structure simulation part that simulates a transfer characteristic of a sound of a virtual acoustic structure and that provides a simulation result of the virtual acoustic structure;

an existing acoustic structure measurement part that measures the transfer characteristic of the existing acoustic structure when the existing acoustic structure transfers a sound and that provides a measurement result of the existing acoustic structure;

another difference data generation part that compares the simulation result of the existing acoustic structure with the simulation result of the virtual acoustic structure, and that generates difference data representing a difference between the simulation result of the existing acoustic structure and the simulation result of the virtual acoustic structure;

another characteristic correction part that corrects the measurement result of the existing acoustic structure based on the difference data, and that generates virtual acoustic structure prediction data representing the transfer characteristic of the sound of the virtual acoustic structure according to the corrected measurement result of the existing acoustic structure; and a prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

12. The simulation apparatus according to claim 9, wherein the existing sound generator simulation part simulates a phase characteristic as the sound generation characteristic of the existing sound generator, the existing sound generator measurement part measures the phase characteristic of the existing sound generator when the existing sound generator actually generates a sound, and the difference data generation part calculates the difference between the simulated phase characteristic of the existing sound generator and the measured phase characteristic of the existing sound generator.

13. The simulation apparatus according to claim 9, further comprising:

a receiving part that receives audio data representing a sound generated by the existing sound generator; and an audio data alteration part that alters the audio data received by the receiving part based on the virtual sound generator prediction data, and that outputs the altered audio data.

14. The simulation apparatus according to claim 9, further comprising:

a transfer characteristic simulation part that simulates a transfer characteristic of a sound of an acoustic structure that is associated with the virtual sound generator, and that provides a simulation result of the transfer characteristic of the acoustic structure; and a prediction data correction part that corrects the virtual sound generator prediction data based on the simulation result of the acoustic structure, and that predicts a composite sound generation characteristic of a combination of the virtual sound generator and the acoustic structure where the virtual sound generator generates the sound and the acoustic structure transfers the generated sound.

15. The simulation apparatus according to claim 9, further comprising:

a transfer characteristic measurement part that measures a transfer characteristic of a sound of an acoustic structure that is associated with the virtual sound generator, and that provides a measurement result of the transfer characteristic of the acoustic structure; and a prediction data correction part that corrects the virtual sound generator prediction data based on the measurement result of the acoustic structure, and that predicts a composite sound generation characteristic of a combination of the virtual sound generator and the acoustic structure where the virtual sound generator generates the sound and the acoustic structure transfers the generated sound.

16. The simulation apparatus according to claim 9, further comprising:

an existing acoustic structure simulation part that simulates a transfer characteristic of a sound of an existing acoustic structure and that provides a simulation result of the existing acoustic structure;

a virtual acoustic structure simulation part that simulates a transfer characteristic of a sound of a virtual acoustic structure and that provides a simulation result of the virtual acoustic structure;

an existing acoustic structure measurement part that measures the transfer characteristic of the existing acoustic structure when the existing acoustic structure transfers a sound;

another difference data generation part that compares the simulation result of the existing acoustic structure with the measurement result of the existing acoustic structure, and that generates difference data representing a difference between the simulation result of the existing acoustic structure and the measurement result of the existing acoustic structure;

another characteristic correction part that corrects the simulation result of the virtual acoustic structure based on the difference data, and that generates virtual acoustic structure prediction data representing the transfer characteristic of the sound of the virtual acoustic structure according to the corrected simulation result of the virtual acoustic structure; and a prediction data correction part that corrects the virtual sound generator prediction data based on the virtual acoustic structure prediction data, and that predicts a composite sound generation characteristic of a combination of the virtual sound generator and the virtual acoustic structure according to the corrected virtual sound generator prediction data, where the virtual sound generator generates the sound and the virtual acoustic structure transfers the sound generated by the virtual sound generator.

17. A non-transitory machine readable medium containing a program executable by a computer to perform a method of predicting a sound generation characteristic of a virtual sound generator, wherein the method comprises:

an existing sound generator simulation process of simulating a sound generation characteristic of an existing sound generator and providing a simulation result;

a virtual sound generator simulation process of simulating the sound generation characteristic of the virtual sound generator and providing a simulation result;

an existing sound generator measurement process of measuring the sound generation characteristic of the existing sound generator when the existing sound generator actually generates a sound and providing a measurement result;

a difference data generation process of comparing the simulation result of the existing sound generator with the simulation result of the virtual sound generator, and generating difference data representing a difference between the simulation result of the existing sound generator and the simulation result of the virtual sound generator; and a characteristic correction process of correcting the measurement result of the existing sound generator based on the difference data, and generating virtual sound generator prediction data representing the sound generation characteristic of the virtual sound generator according to the corrected measurement result of the existing sound generator.

18. A non-transitory machine readable medium containing a program executable by a computer to perform a method of predicting a sound generation characteristic of a virtual sound generator, wherein the method comprises:

an existing sound generator simulation process of simulating a sound generation characteristic of an existing sound generator and providing a simulation result;

a virtual sound generator simulation process of simulating the sound generation characteristic of the virtual sound generator and providing a simulation result;

an existing sound generator measurement process of measuring the sound generation characteristic of the existing sound generator when the existing sound generator actually generates a sound and providing a measurement result;

a difference data generation process of comparing the simulation result of the existing sound generator with the measurement result of the existing sound generator, and generating difference data representing a difference between the simulation result of the existing sound generator and the measurement result of the existing sound generator; and a characteristic correction process of correcting the simulation result of the virtual sound generator based on the difference data, and generating virtual sound generator prediction data representing the sound generation characteristic of the virtual sound generator according to the corrected simulation result of the virtual sound generator.

* * * * *